(12) United States Patent
Cheng et al.

(10) Patent No.: US 8,753,151 B2
(45) Date of Patent: Jun. 17, 2014

(54) CONNECTOR MODULE AND HANDHELD ELECTRONIC DEVICE

(75) Inventors: Ying-Yen Cheng, Taoyuan County (TW); I-Cheng Chuang, Taoyuan County (TW); Chih-Wei Tu, Taoyuan County (TW); Yin-Chou Chen, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 49 days.

(21) Appl. No.: 13/604,634

(22) Filed: Sep. 6, 2012

(65) Prior Publication Data

US 2014/0065890 A1    Mar. 6, 2014

(51) Int. Cl.
*H01R 24/00*    (2011.01)

(52) U.S. Cl.
USPC ........................................... 439/668

(58) Field of Classification Search
USPC ............. 439/668, 669, 638, 620.101, 620.11, 439/620.12, 620.16–620.18; 361/679.41, 361/679.56, 679.01, 816
See application file for complete search history.

(56) References Cited

U.S. PATENT DOCUMENTS

| | | | |
|---|---|---|---|
| 6,790,095 B2 * | 9/2004 | Liu | 439/668 |
| 7,101,230 B2 * | 9/2006 | Ma | 439/668 |
| 2004/0242076 A1 * | 12/2004 | Nakai et al. | 439/668 |
| 2009/0098746 A1 | 4/2009 | Chiu et al. | |
| 2010/0216526 A1 | 8/2010 | Chen et al. | |
| 2012/0190228 A1 | 7/2012 | Lee | |
| 2013/0183867 A1 * | 7/2013 | Wu et al. | 439/668 |

FOREIGN PATENT DOCUMENTS

| | | |
|---|---|---|
| EP | 1908263 B1 | 9/2011 |
| WO | 2009056143 A2 | 5/2009 |

OTHER PUBLICATIONS

"Office Action of German Counterpart Application", issued on Feb. 3, 2014, p. 1-p. 12.

* cited by examiner

*Primary Examiner* — Renee S Luebke
*Assistant Examiner* — Harshad Patel
(74) *Attorney, Agent, or Firm* — Jianq Chyun IP Office

(57) ABSTRACT

A connector module includes an electrical connector and a sound-receiving component. The connector includes an insulation casing and multiple conductive terminals disposed at and passing through the insulating casing. The insulation casing has a jack hole at the outer-side thereof and a channel at the inner-side thereof and extending along an axial direction. The connector is adapted to connect the plug plugged into the channel from the jack hole. The sound-receiving component is disposed at the insulation casing along a radial direction, wherein the insulation casing has an opening communicated with the channel and corresponding to the sound-receiving component and the sound-receiving component is adapted to receive the sound transmitted into the channel from the jack hole via the opening. A handheld electronic device is also provided which includes a casing and a connector module disposed in the casing and adapted to connect a plug or receive a sound.

21 Claims, 4 Drawing Sheets

CONNECTOR MODULE AND HANDHELD ELECTRONIC DEVICE

BACKGROUND OF THE INVENTION

1. Field of the Invention

The invention generally relates to a connector module and an electronic device, and more particularly, to a connector module of a handheld electronic device and a handheld electronic device.

2. Description of Related Art

In recent years, along with the increasingly developments of the technology industry, electronic products such as mobile phones, tablet computer, notebook computer and smart phones become more and more popular. The electronic products are developing towards convenient usage, multi-functions and aesthetically pleasing design direction so as to provide users with more option selections.

In addition to the functions of electronic products themselves, an electronic product can also increase the use function thereof by connecting it to external devices. Therefore, these electronic products commonly employ connectors therein, so that the electronic products can connect to other external devices such as audio device or microphone (MIC) and further execute additional applications for playing music or recording. In this case, the chassis of the electronic products will have holes corresponding to these connectors thereon, so that these external devices are able to respectively connect with the internal connectors of the electronic products. However, when more and more connectors are disposed inside an electronic product to connect more and more external apparatus, many holes may damage the electronic product's appearance.

SUMMARY OF THE INVENTION

Accordingly, the invention is directed to a connector module, which has functions of connecting plugs and receiving sound and is able to reduce the number of the employed outward holes of the handheld electronic device.

The invention is also directed to a handheld electronic device, which has a connector module to reduce the number of the employed outward holes.

The invention provides a connector module, which is adapted to connect a plug or receive a sound and includes an electrical connector and a sound-receiving component. The electrical connector includes an insulation casing and a plurality of conductive terminals. The insulation casing has a jack hole and a channel, in which the channel is located at inner-side of the insulation casing and extends along an axial direction and the jack hole is located at outer-side of the insulation casing and connected to the channel. The conductive terminals are disposed at and passing through the insulation casing, in which the electrical connector is adapted to connect the plug plugged into the channel from the jack hole and contact the conductive terminals. The sound-receiving component is disposed at the insulation casing along a radial direction perpendicular to the axial direction, in which the insulation casing has an opening communicated with the channel and corresponding to the sound-receiving component, and the sound-receiving component is adapted to, via the opening, receive the sound transmitted into the channel from the jack hole.

The invention further provides a handheld electronic device, which includes a casing and a connector module. The casing has an outward hole, and the connector module is disposed in the casing, adapted to connect a plug or receive a sound via the outward hole and includes an electrical connector and a sound-receiving component. The electrical connector includes an insulation casing and a plurality of conductive terminals. The insulation casing has a jack hole and a channel, in which the channel is located at inner-side of the insulation casing and extends along an axial direction and the jack hole is located at outer-side of the insulation casing, corresponding to the outward hole and connected to the channel. The conductive terminals are disposed at and passing through the insulation casing, in which the electrical connector is adapted to connect the plug plugged into the channel from the jack hole and contact the conductive terminals. The sound-receiving component is disposed at the insulation casing along a radial direction perpendicular to the axial direction, in which the insulation casing has an opening communicated with the channel and corresponding to the sound-receiving component, and the sound-receiving component is adapted to, via the opening, receive the sound transmitted into the channel from the jack hole.

In an embodiment of the present invention, the above-mentioned connector module further includes a circuit board, in which the electrical connector is disposed at the circuit board, the insulation casing has a top-surface, a bottom-surface opposite to the top-surface and two side-surfaces opposite to each other and connecting with the top-surface and the bottom-surface, and the bottom-surface of the electrical connector faces the circuit board.

In an embodiment of the present invention, the above-mentioned sound-receiving component is disposed at one of the side-surfaces of the insulation casing, and the opening is corresponding to the sound-receiving component and located at the above-mentioned side-surface.

In an embodiment of the present invention, the above-mentioned electrical connector and sound-receiving component are respectively disposed at the opposite two side-surfaces of the circuit board to make the sound-receiving component located at the bottom-surface of the insulation casing, and the opening is corresponding to the sound-receiving component and located at the bottom-surface.

In an embodiment of the present invention, the above-mentioned circuit board has a through hole corresponding to the opening, and the sound-receiving component is adapted to, via the opening and the through hole, receive the sound transmitted into the channel from the jack hole.

In an embodiment of the present invention, the above-mentioned insulation casing has a pilot hole extending from the opening and located in the through hole.

In an embodiment of the present invention, each of the conductive terminals mentioned above has a contacting portion and a soldering portion, the contacting portion is located in the channel and adapted to contact the plug and the soldering portion is exposed out of the insulation casing and soldered at the circuit board.

In an embodiment of the present invention, the above-mentioned soldering portions of the conductive terminals are located at rear-end of the insulation casing.

In an embodiment of the present invention, the above-mentioned connector module further includes a soundproofing component disposed on the circuit board and cladding the sound-receiving component.

In an embodiment of the present invention, the above-mentioned electrical connector is an audio jack and the sound-receiving component is a microphone (MIC).

In an embodiment of the present invention, the above-mentioned handheld electronic device further includes a display panel disposed at a surface of the casing, in which the connector module is located between a top-portion of the casing and the display panel and the jack hole is corresponding to the outward hole.

Based on the description above, the invention provides a connector module and a handheld electronic device. The connector module includes an electrical connector and a sound-receiving component and is disposed in the casing of the handheld electronic device. The electrical connector is adapted to connect the plug plugged into the channel from the jack hole of the insulation casing of the electrical connector and contact the conductive terminals of the electrical connector. The sound-receiving component is adapted to receive the sound transmitted into the channel from the jack hole via the opening communicated with the channel and corresponding to the sound-receiving component. In this way, the connector module has the functions of connecting the plug or receiving the sound and is able to reduce the number of the outward holes of the handheld electronic device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
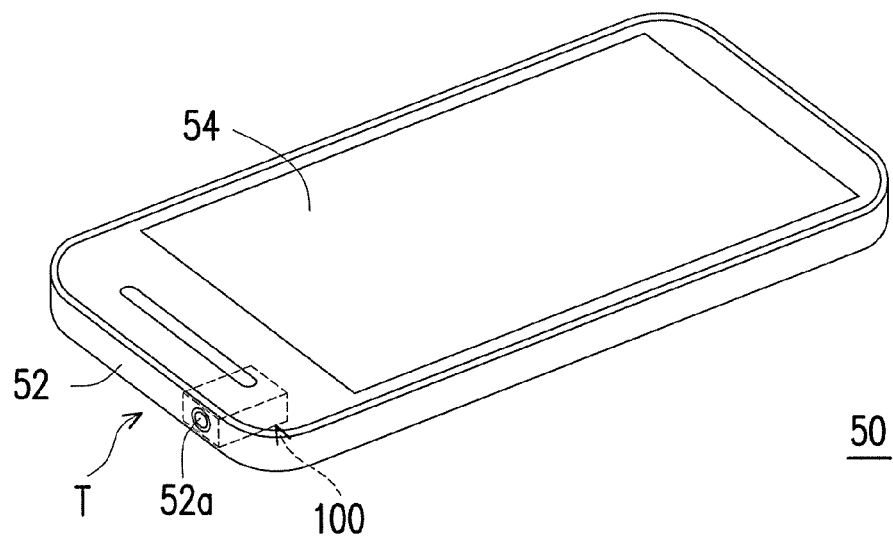
FIG. 1 is a schematic diagram of a handheld electronic device according to an embodiment of the invention.
Figure 2:
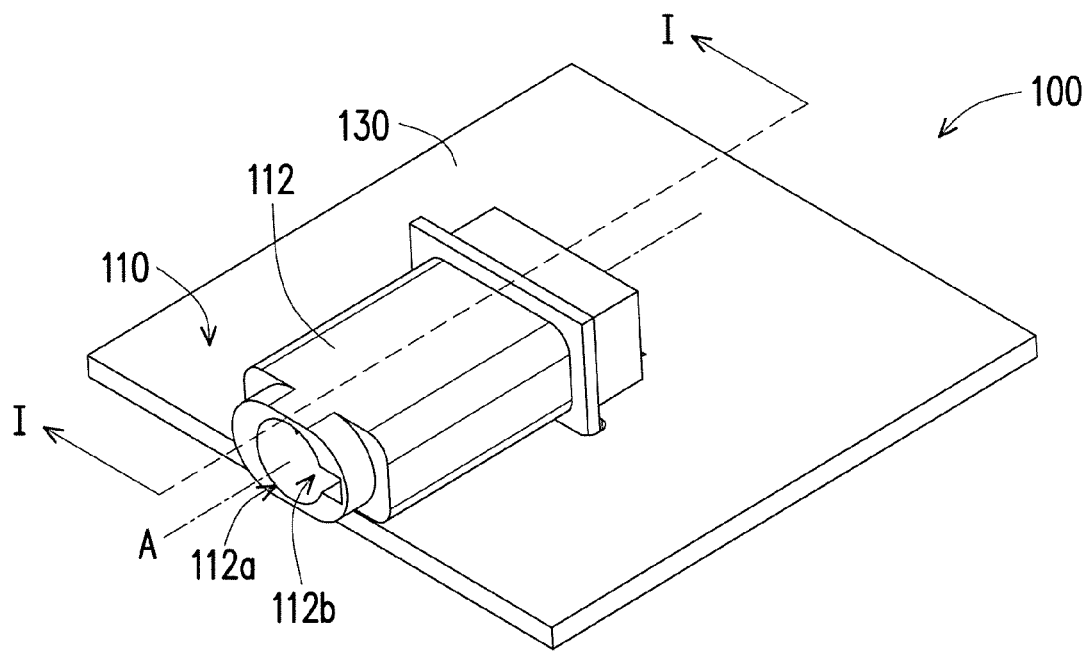
FIG. 2 is a schematic diagram of the connector module of FIG. 1.
Figure 3:
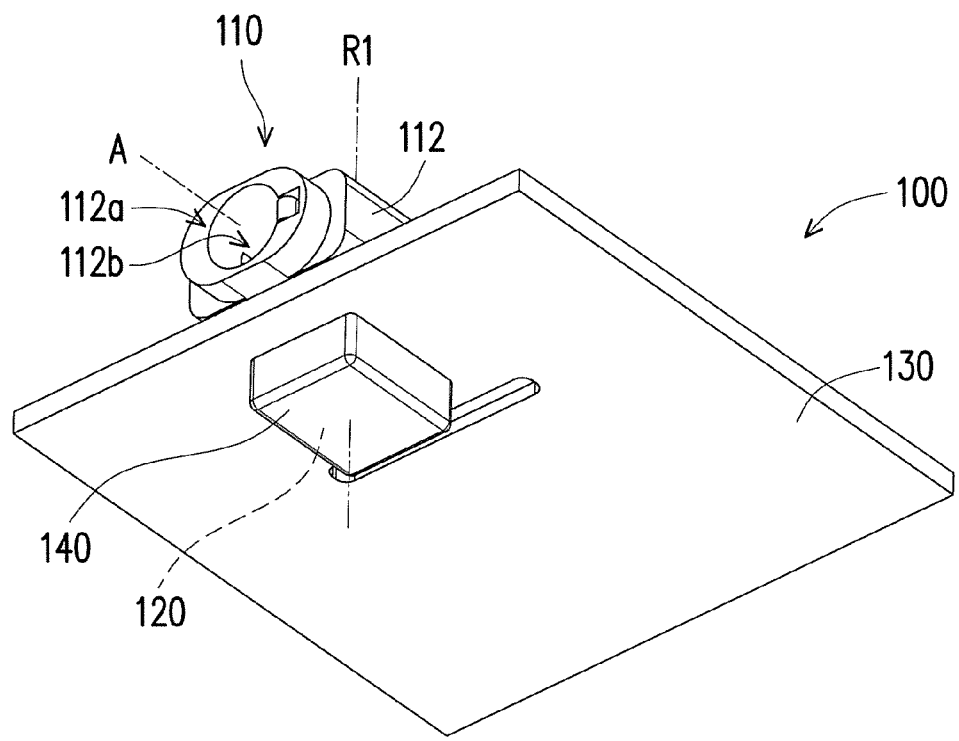
FIG. 3 is a diagram in another angle of view of the connector module of FIG. 2.
Figure 4:
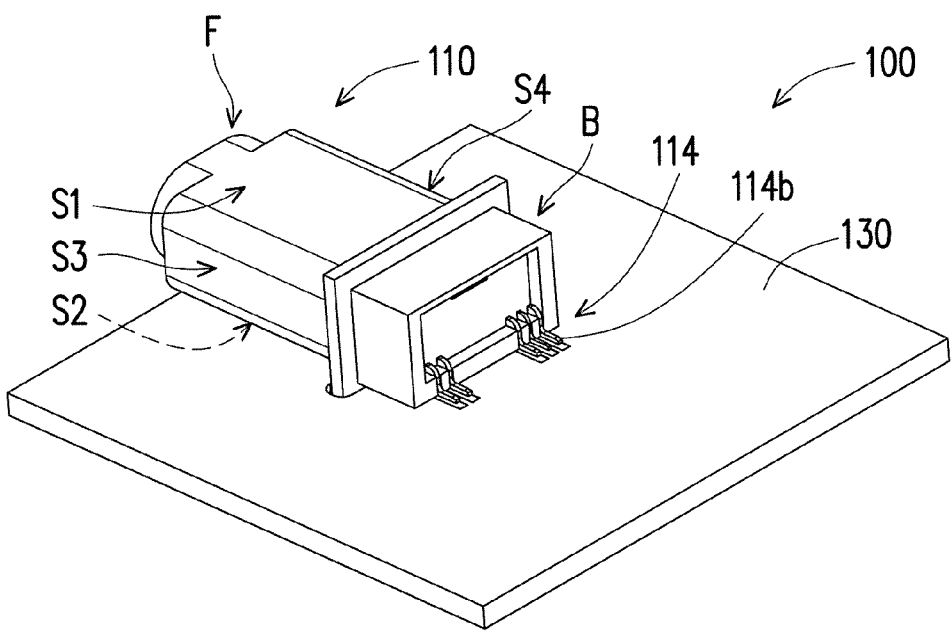
FIG. 4 is a diagram in yet another angle of view of the connector module of FIG. 2.

FIG. 1 is a schematic diagram of a handheld electronic device according to an embodiment of the invention, FIG. 2 is a schematic diagram of the connector module of FIG. 1, FIG. 3 is a diagram in another angle of view of the connector module of FIG. 2 and FIG. 4 is a diagram in yet another angle of view of the connector module of FIG. 2. Referring to FIGS. 1-4, in the embodiment, a handheld electronic device 50 includes a casing 52 and a connector module 100. The casing 52 has an outward hole 52a and the connector module 100 is disposed in the casing 52. The handheld electronic device 50 is, for example, mobile phone or smart phone and the casing 52 is a chassis, but the invention does not limit the type of the handheld electronic device 50.

On the other hand, the connector module 100 includes an electrical connector 110 and a sound-receiving component 120. The electrical connector 110 is, for example, an audio jack and the sound-receiving component 120 is, for example, a microphone (MIC), but the invention does not limit to.

In more details, the electrical connector 110 includes an insulation casing 112 and a plurality of conductive terminals 114 (shown by FIG. 4). The conductive terminals 114 are disposed at and pass through the insulation casing 112. The insulation casing 112 has a jack hole 112a and a channel 112b, in which the channel 112b is located at the inner-side of the insulation casing 112 and extends along the axial direction A. The jack hole 112a is located at the outer-side of the insulation casing 112, corresponding to the hole 52a and connected to the channel 112b. In other words, the jack hole 112a and the channel 112b can make the inner-side and the outer-side of the insulation casing 112 communicated with each other, while the outward hole 52a and the jack hole 112a can make the outer portion of the handheld electronic device 50 and the connector module 100 communicated with each other. In this way, the electrical connector 110 is configured to connect the plug plugged into the channel 112b from the jack hole 112a via the outward hole 52a and contact the conductive terminals 114 (not shown).

In the embodiment, the handheld electronic device 50 further includes a display panel 54 disposed at a surface of the casing 52, in which the connector module 100 is located between the top-portion T of the casing 52 and the display panel 54. Thereby, the connector module 100 can be shielded by a part of the casing 52 from the top-portion T to the side-edge of the display panel 54. At the time, the outward hole 52a is located at the side-edge of the top-portion T of the casing 52 and the jack hole 112a is corresponding to the outward hole 52a. In other embodiments however, the outward hole of the handheld electronic device can be located at other positions of the casing, which the invention is not limited to.

In the embodiment, the connector module 100 further includes a circuit board 130 and the electrical connector 110 is disposed on the circuit board 130, in which the insulation casing 112 of the electrical connector 110 has a top-surface S1, a bottom-surface S2 opposite to the top-surface S1 and two side-surfaces S3 and S4 opposite to each other and connecting with the top-surface S1 and the bottom-surface S2. The bottom-surface S2 of the electrical connector 110 faces the circuit board 130 and the electrical connector 110 is disposed on the circuit board 130 with the bottom-surface S2. The sound-receiving component 120 is disposed at the insulation casing 112 along the radial direction R1 perpendicular to the axial direction A.

In the embodiment, the electrical connector 110 and the sound-receiving component 120 are respectively disposed at the opposite two sides of the circuit board 130. In other words, the sound-receiving component 120 can be considered to be disposed under the insulation casing 112 along the radial direction R1 perpendicular to the axial direction A, in which the bottom-surface S2 of the insulation casing 112 faces the sound-receiving component 120 and the circuit board 130 is located between the insulation casing 112 and the sound-receiving component 120, as shown by FIG. 3. In addition, the electrical connector 110 and the sound-receiving component 120 can be fixed on the circuit board 130 by using adhesive, however the invention does not limit the fixing way of the electrical connector 110 and the sound-receiving component 120 onto the circuit board 130.

Figure 5:
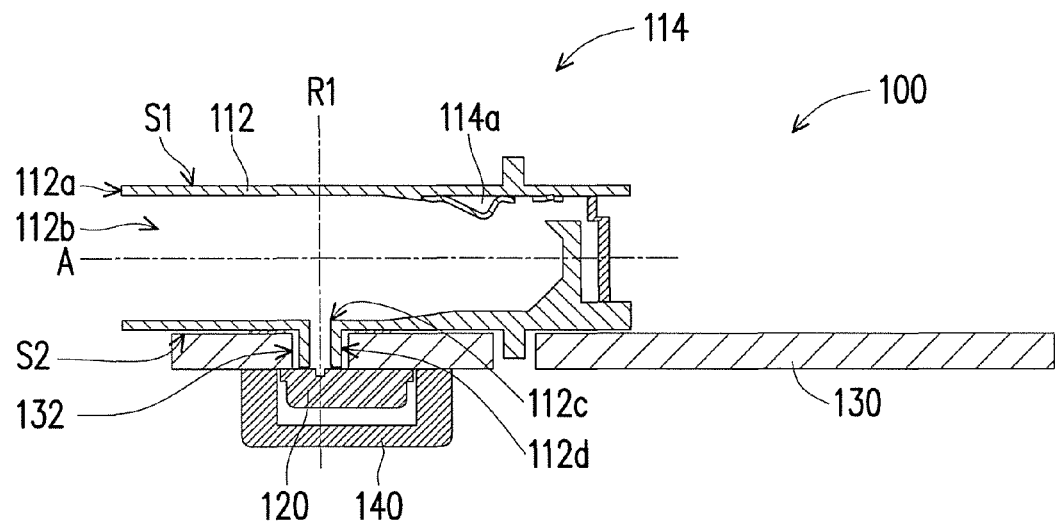
FIG. 5 is a cross-sectional diagram of the connector module of FIG. 2 along line I-I.

FIG. 5 is a cross-sectional diagram of the connector module of FIG. 2 along line I-I. Referring to FIG. 5, in the embodiment, the insulation casing 112 has an opening 112c communicated with the channel 112b and corresponding to the sound-receiving component 120. The opening 112c is corresponding to the sound-receiving component 120 and located at the bottom-surface S2 of the insulation casing 112. Since the opening 112c is communicated with the channel 112b, so that the sound-receiving component 120 is adapted to receive the sound transmitted into the channel 112b from the jack hole 112a via the opening 112c. In this way, the connector module 100 is configured to connect the plug or receive the sound via the outward hole 52a.

On the other hand, in the embodiment, the electrical connector 110 and the sound-receiving component 120 are respectively located at the opposite two sides of the circuit board 130. Accordingly, the circuit board 130 has a through hole 132 corresponding to the opening 112c. The through hole 132 goes through the circuit board 130 and connects with the opening 112c and the sound-receiving component 120, so that the opening 112c and the through hole 132 make the channel 112b and the sound-receiving component 120 communicated with each other. As a result, the sound-receiving component 120 can receive the sound transmitted into the channel 112b from the jack hole 112a via the opening 112c and the through hole 132.

Besides, in the embodiment, the insulation casing 112 further has a pilot hole 112d extending from the opening 112c. When the electrical connector 110 is disposed on the circuit board 130, the pilot hole 112d extending from the opening 112c is located in the through hole 132, and the pilot hole 112d enables the connection between the opening 112c and the through hole 132 more closed. Therefore, when the sound is transmitted from the jack hole 112a into the channel 112b and transmitted into the sound-receiving component 120 via the opening 112c and the through hole 132, the pilot hole 112d is able to reduce the chance for the sound to leak outside so as to keep the receivable audio's integrity of the sound-receiving component 120.

On the other hand, the sound-receiving component 120 is disposed under the insulation casing 112 along the radial direction R1 perpendicular to the axial direction A, so that the pilot hole 112d extends from the opening 112c towards the direction far away from the bottom-surface S2 along the radial direction R1. In addition, the insulation casing 112 has a front-end F and a rear-end B, in which the jack hole 112a is located at the front-end F to make the front-end F of the insulation casing 112 open, while the rear-end B of the insulation casing 112 is closed. After the sound enters the channel 112b from the jack hole 112a and is transmitted into the channel 112b along the axial direction A, the sound is blocked by the closed rear-end B to be transmitted to the sound-receiving component 120 along the radial direction R1 via the opening 112c and the pilot hole 112d located in the through hole 132.

Referring to FIGS. 4 and 5, in the embodiment, each of the conductive terminals 114 disposed at and passing through the insulation casing 112 has a contacting portion 114a (shown in FIG. 5) and a soldering portion 114b (shown in FIG. 4). The soldering portion 114b is exposed out of the insulation casing 112 and soldered at the circuit board 130, while the contacting portion 114a is located in the channel 112b and connects with the soldering portion 114b. After the plug is plugged into the channel 112b from the jack hole 112a along the axial direction A, the plug can contact the contacting portion 114a and electrically connect with the conductive terminals 114, and electrically connect to the circuit board 130 via the contacting portion 114a soldered at the circuit board 130.

On the other hand, in the embodiment, the soldering portion 114b of each of the conductive terminals 114 is located at the rear-end B of the insulation casing 112. The soldering portion 114b goes out of the outer-side of the insulation casing 112 from the inner-side of the insulation casing 112 and is soldered at the circuit board 130. Therefore, by disposing the soldering portion 114b at the rear-end B of the insulation casing 112, it is no needed to make holes at the two side-surfaces S3 and S4 of the insulation casing 112 for the soldering portion 114b to go out of the outer-side of the insulation casing 112 from the inner-side of the insulation casing 112 so as to advance the closeness of the channel 112b.

As description above, the rear-end B of the insulation casing 112 is in closed stated, and thus, the channel 112b can be considered to be communicated with the inner-side and the outer-side of the channel 112b only via the jack hole 112a, the opening 112c and the pilot hole 112d. After the sound reaches in the channel 112b from the jack hole 112a, the sound further is transmitted to the sound-receiving component 120 via the opening 112c and the pilot hole 112d. As a result, the channel 112b of the insulation casing 112 has better sound-receiving effect.

On the other hand, referring FIGS. 3 and 5 again, in the embodiment, the connector module 100 further includes a soundproofing component 140 disposed on the circuit board 130 and cladding the sound-receiving component 120. By this design, the soundproofing component 140 is able to avoid the sound-receiving component 120 from receiving the sound transmitted to the sound-receiving component 120 rather than from the jack hole 112a and the channel 112b and to prevent the sound-receiving component 120 from interference of the outer noise. In the embodiment, the material of the soundproofing component 140 is rubber, but in other embodiments, the soundproofing component 140 can be made of other materials with soundproofing effect, which the invention is not limited to.

In short, the electrical connector 110 and the sound-receiving component 120 of the connector module 100 can use the shared jack hole 112a to perform the functions thereof respectively. Thus, when the connector module 100 is disposed in the casing 52 of the handheld electronic device 50, the casing 52 requires only one outward hole 52a corresponding to the jack hole 112a to be disposed so that the connector module 100 can connect the plug or receive the sound and can reduce the number of the outward holes 52a of the handheld electronic device 50.

Figure 6:
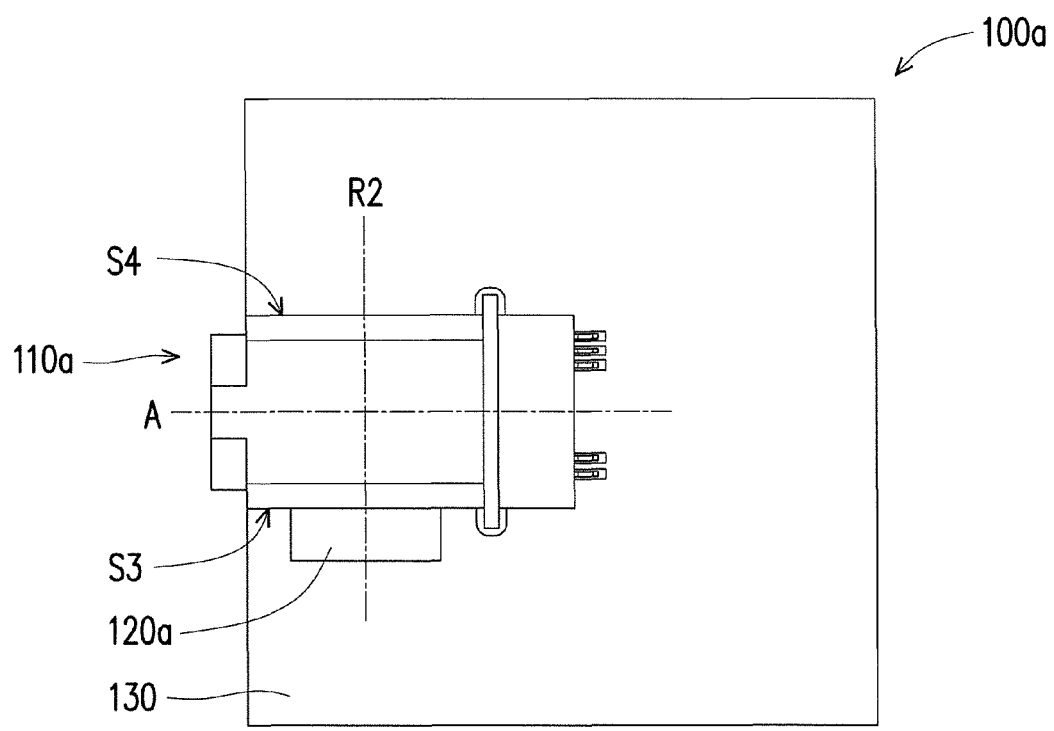
FIG. 6 is a top-view diagram of a connector module according to another embodiment of the invention.
Figure 7:
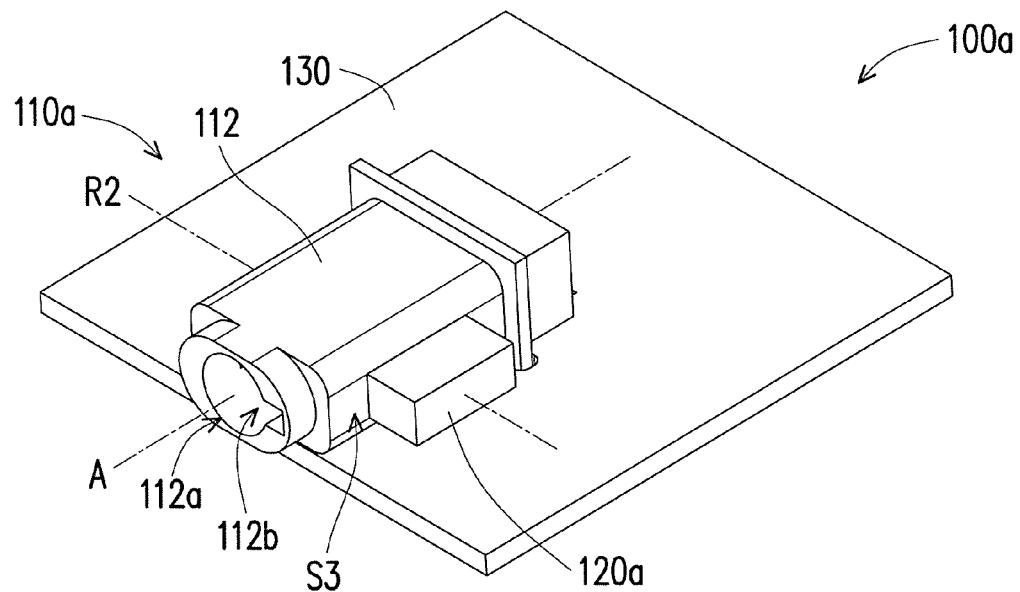
FIG. 7 is a schematic diagram of the connector module of FIG. 6.

FIG. 6 is a top-view diagram of a connector module according to another embodiment of the invention and FIG. 7 is a schematic diagram of the connector module of FIG. 6. Referring to FIGS. 6 and 7, in the embodiment, the connector module 100a can be disposed also at the handheld electronic device 50. Differently from the connector module 100, the sound-receiving component 120a of the connector module 100a is disposed at the side-surface S3 of the insulation casing 112 of the electrical connector 110a along a radial direction R2 perpendicular to the axial direction A, and the opening (not shown) is corresponding to the sound-receiving component 120a and located at the side-surface S3.

Both the electrical connector 110a and the sound-receiving component 120a are located the same side of the circuit board 130 so that there is no need of disposing the through hole 132 at the circuit board 130. In this way, the sound can enter the channel 112b from the jack hole 112a via the outward hole 52a and be transmitted into the channel 112b along the axial direction A, followed by reaching to the sound-receiving component 120a via the opening along the radial direction R2. In addition, by the design that the sound-receiving component 120a is disposed at the side-surface S3 of the insulation casing 112 along a radial direction R2 perpendicular to the axial direction A, the connector module 100a has a shorter length. Therefore, when the connector module 100a is applied in the handheld electronic device 50 as shown by FIG. 1, the portion of the casing 52 of the handheld electronic device 50 from the top-portion T to the side-edge of the display panel 54 can be shortened so as to reduce the volume of the handheld electronic device 50.

In other unshown embodiments, in the same way, the sound-receiving component of the connector module can be disposed at the top-surface or another side-surface of the insulation casing of the electrical connector along the radial direction perpendicular to the axial direction, and the position of the opening can be adjusted according to the position of the sound-receiving component, which the invention is not limited to.

Figure 8:
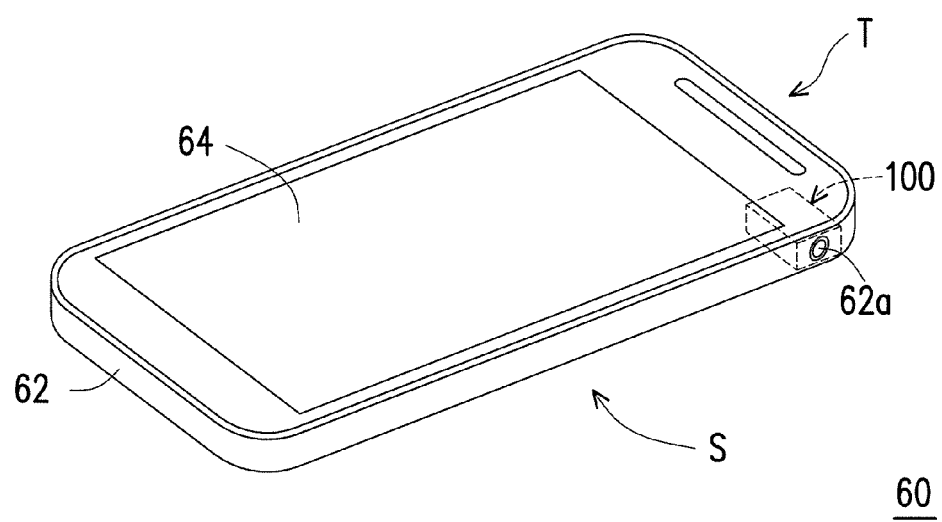
FIG. 8 is a schematic diagram of a handheld electronic device according to another embodiment of the invention.

FIG. 8 is a schematic diagram of a handheld electronic device according to another embodiment of the invention. Referring to FIGS. 1 and 8, in the embodiment, the connector module 100 is located between the top-portion T of the casing 62 and the display panel 64. Differently from the handheld electronic device 50 as shown in FIG. 1, in the handheld electronic device 60 of the embodiment, the outward hole 62*a* is located at the side-edge of the side-portion S of the casing 62, while the jack hole 112*a* is corresponding to the outward hole 62*a*. In other embodiments, the outward hole can be disposed at other positions, for example, at the side-edge of the bottom-portion opposite to the top-portion. In this way, the handheld electronic device can adjust the positions of the outward hole and the connector module depending on the requirement, which the invention is not limited to.

In summary, the invention provides a connector module and a handheld electronic device. The connector module includes an electrical connector and a sound-receiving component and is disposed in the casing of the handheld electronic device. The electrical connector and the sound-receiving component share the jack hole to perform the functions thereof respectively. The electrical connector is adapted to connect the plug plugged into the channel from the jack hole of the insulation casing of the electrical connector and contact the conductive terminals of the electrical connector. The sound-receiving component is adapted to receive the sound transmitted into the channel from the jack hole via the opening communicated with the channel and corresponding to the sound-receiving component. In this way, the connector module has the functions of connecting the plug or receiving the sound and is able to reduce the number of the outward holes of the handheld electronic device. In addition, the soldering portions of the conductive terminals are disposed at the rear-end of the insulation casing for advancing the closeness of the channel. The channel of the electrical connector is communicated with the inner-side and the outer-side of the channel via the jack hole, the opening and the pilot hole, while the opening and the pilot hole are communicated with the channel and the sound-receiving component. In this way, the channel provides the connector module with better sound-receiving component effect.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A connector module, adapted to connect a plug or receive a sound and comprising:
   an electrical connector, comprising:
      an insulation casing, having a jack hole and a channel, wherein the channel is located at inner-side of the insulation casing and extends along an axial direction and the jack hole is located at outer-side of the insulation casing and connected to the channel; and
      a plurality of conductive terminals, disposed at and passing through the insulation casing, wherein the electrical connector is adapted to connect the plug plugged into the channel from the jack hole and contact the conductive terminals; and
   a sound-receiving component, disposed at the insulation casing along a radial direction perpendicular to the axial direction, wherein the insulation casing has an opening communicated with the channel and corresponding to the sound-receiving component, and the sound-receiving component is adapted to, via the opening, receive the sound transmitted into the channel from the jack hole.

2. The connector module as claimed in claim 1, further comprising:
   a circuit board, wherein the electrical connector is disposed at the circuit board, the insulation casing has a top-surface, a bottom-surface opposite to the top-surface and two side-surfaces opposite to each other and connecting with the top-surface and the bottom-surface, and the bottom-surface of the electrical connector faces the circuit board.

3. The connector module as claimed in claim 2, wherein the sound-receiving component is disposed at one of the side-surfaces of the insulation casing, and the opening is corresponding to the sound-receiving component and located at the above-mentioned side-surface.

4. The connector module as claimed in claim 2, wherein the electrical connector and the sound-receiving component are respectively disposed at the opposite two side-surfaces of the circuit board to make the sound-receiving component located at the bottom-surface of the insulation casing, and the opening is corresponding to the sound-receiving component and located at the bottom-surface.

5. The connector module as claimed in claim 4, wherein the circuit board has a through hole corresponding to the opening, and the sound-receiving component is adapted to, via the opening and the through hole, receive the sound transmitted into the channel from the jack hole.

6. The connector module as claimed in claim 5, wherein the insulation casing has a pilot hole extending from the opening and located in the through hole.

7. The connector module as claimed in claim 2, wherein each of the conductive terminals has a contacting portion and a soldering portion, the contacting portion is located in the channel and adapted to contact the plug and the soldering portion is exposed out of the insulation casing and soldered at the circuit board.

8. The connector module as claimed in claim 7, wherein the soldering portions of the conductive terminals are located at rear-end of the insulation casing.

9. The connector module as claimed in claim 1, further comprising:
   a soundproofing component, disposed on the circuit board and cladding the sound-receiving component.

10. The connector module as claimed in claim 1, wherein the electrical connector is an audio jack and the sound-receiving component is a microphone (MIC).

11. A handheld electronic device, comprising:
   a casing, having an outward hole; and
   a connector module, disposed in the casing and adapted to connect a plug or receive a sound via the outward hole and comprising:
      an electrical connector, comprising:
         an insulation casing, having a jack hole and a channel, wherein the channel is located at inner-side of the insulation casing and extends along an axial direction and the jack hole is located at outer-side of the insulation casing, corresponding to the outward hole and connected to the channel; and a plurality of conductive terminals, disposed at and passing through the insulation casing, wherein the electrical connector is adapted to connect the plug plugged into the channel from the jack hole and contact the conductive terminals; and a sound-receiving component, disposed at the insulation casing along a radial direction perpendicular to the axial direction, wherein the insulation casing has an opening communicated with the channel and corresponding to the sound-receiving component, and the sound-receiving component is adapted to, via the opening, receive the sound transmitted into the channel from the jack hole.

12. The handheld electronic device as claimed in claim 11, wherein the connector module further comprises a circuit board, the electrical connector is disposed on the circuit board, the insulation casing has a top-surface, a bottom-surface opposite to the top-surface and two side-surfaces opposite to each other and connecting with the top-surface and the bottom-surface, and the bottom-surface of the electrical connector faces the circuit board.

13. The handheld electronic device as claimed in claim 12, wherein the sound-receiving component is disposed at one of the side-surfaces of the insulation casing, and the opening is corresponding to the sound-receiving component and located at the above-mentioned side-surface.

14. The handheld electronic device as claimed in claim 12, wherein the electrical connector and the sound-receiving component are respectively disposed at the opposite two side-surfaces of the circuit board to make the sound-receiving component located at the bottom-surface of the insulation casing, and the opening is corresponding to the sound-receiving component and located at the bottom-surface.

15. The handheld electronic device as claimed in claim 14, wherein the circuit board has a through hole corresponding to the opening, and the sound-receiving component is adapted to, via the opening and the through hole, receive the sound transmitted into the channel from the jack hole.

16. The handheld electronic device as claimed in claim 15, wherein the insulation casing has a pilot hole extending from the opening and located in the through hole.

17. The handheld electronic device as claimed in claim 12, wherein each of the conductive terminals has a contacting portion and a soldering portion, the contacting portion is located in the channel and adapted to contact the plug and the soldering portion is exposed out of the insulation casing and soldered at the circuit board.

18. The handheld electronic device as claimed in claim 17, wherein the soldering portions of the conductive terminals are located at rear-end of the insulation casing.

19. The handheld electronic device as claimed in claim 11, wherein the connector module further comprises a sound-proofing component, disposed on the circuit board and cladding the sound-receiving component.

20. The handheld electronic device as claimed in claim 11, wherein the electrical connector is an audio jack and the sound-receiving component is a microphone (MIC).

21. The handheld electronic device as claimed in claim 11, further comprising a display panel disposed at a surface of the casing, wherein the connector module is located between a top-portion of the casing and the display panel and the jack hole is corresponding to the outward hole.

* * * * *